United States Patent
Takimoto et al.

(10) Patent No.: US 6,337,563 B2
(45) Date of Patent: Jan. 8, 2002

(54) DC-DC CONVERTER AND SEMICONDUTOR INTEGRATED CIRCUIT DEVICE FOR DC-DC CONVERTER

(75) Inventors: Kyuichi Takimoto; Toshiyuki Matsuyama; Yoshihiro Nagaya, all of Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/769,240

(22) Filed: Jan. 26, 2001

(30) Foreign Application Priority Data

Jun. 8, 2000 (JP) ........................................ 2000-171735

(51) Int. Cl.[7] .............................................. G05F 1/40
(52) U.S. Cl. ........................................ 323/284; 320/140
(58) Field of Search ................................ 323/282, 284, 323/274; 320/128, 140

(56) References Cited

U.S. PATENT DOCUMENTS

| | | | | |
|---|---|---|---|---|
| 4,758,937 A | * | 7/1988 | Usui et al. | ........................ 363/19 |
| 5,247,239 A | * | 9/1993 | Yamamura et al. | ........... 323/272 |
| 5,396,163 A | * | 3/1995 | Nor et al. | ........................ 320/21 |
| 5,583,751 A | * | 12/1996 | Nakazawa et al. | ............. 363/20 |
| 5,710,506 A | * | 1/1998 | Broell et al. | .................. 320/522 |
| 5,959,371 A | * | 9/1999 | Dooley et al. | ............... 307/130 |
| 6,118,254 A | * | 9/2000 | Faulk | ........................... 320/141 |

FOREIGN PATENT DOCUMENTS

| JP | A-8-126221 | 5/1996 |
|---|---|---|
| JP | A-10-322931 | 12/1998 |

* cited by examiner

Primary Examiner—Adolf Deneke Berhane
(74) Attorney, Agent, or Firm—Arent Fox Kintner Plotkin & Kahn, PLLC

(57) ABSTRACT

A DC-DC converter generally includes a supply circuit, a charge circuit, and a control unit connected to the charge circuit. The charge circuit receives the input current and supplying a charge current to the battery. The control unit controls the charge current according to the results of comparisons between various currents and voltages and corresponding threshold levels. The control unit, which may be constructed on a single-chip semiconductor substrate, includes a differential charge controller, a charge current controller, a charge voltage controller, and a dynamic charge controller. These elements respectively compare the input current, the charge current, the charge voltage and an input voltage from the external DC power supply with a threshold values and control the charge current and charge voltage according to a result of the comparisons.

13 Claims, 9 Drawing Sheets

US 6,337,563 B2

DC-DC CONVERTER AND SEMICONDUTOR INTEGRATED CIRCUIT DEVICE FOR DC-DC CONVERTER

BACKGROUND OF THE INVENTION

The present invention relates to a DC—DC converter and a semiconductor integrated circuit device for a DC—DC converter, and, more particularly, to a DC—DC converter which is used as a power supply for a portable electronic apparatus.

A DC—DC converter is installed in a portable electronic apparatus, such as a notebook type personal computer. The DC—DC converter supplies DC power, supplied from an external AC adapter, to internal circuits of an electronic apparatus and charges a battery equipped as an auxiliary power supply.

To operate the AC adapter stably and safely, the DC—DC converter is designed in such a way that the sum of the current consumed by the internal circuits and the charge current of the battery becomes smaller than the current supplying capacity of the AC adapter. When AC adapters of different current supplying capacities are to be used, it is necessary to use the current supplying capacity of each AC adapter to the full.

FIG. 1 is a schematic circuit diagram of a DC—DC converter 1 according to first prior art. The DC—DC converter 1 has a control unit 20 constructed on a single-chip semiconductor substrate and a plurality of external devices.

The output signal, SG1, of the control unit 20 is supplied to the gate of a switching transistor 3 which is preferably comprised of a P channel MOS transistor. An input voltage Vin (the output voltage of an AC adapter 4) is applied via a resistor R1 to the source of the switching transistor 3 from the AC adapter 4 connected to an electronic apparatus.

The input voltage Vin is applied to a first output terminal EX1 via the resistor R1 and a diode D1. An output voltage Vout1 is supplied to the internal circuits of the electronic apparatus from the first output terminal EX1.

The drain of the switching transistor 3 is connected to a second output terminal EX2 via an output coil 5 and a resistor R2. The second output terminal EX2 is connected to a battery BT and connected to the first output terminal EX1 via a diode D2. A charge voltage Vout2 of the battery BT is output from the second output terminal EX2.

The drain of the switching transistor 3 is also connected to the cathode of a flywheel diode 6 whose anode is connected to a ground GND. The node between the output coil 5 and the resistor R2 is connected to the ground GND via a capacitor 7. The output coil 5 and capacitor 7 constitute a smoothing circuit which smoothes the output voltage Vout2.

The control unit 20 includes first and second current detectors 8 and 9, first to third differential voltage amplification circuits 10, 11 and 12, a PWM comparison circuit 13, an oscillation circuit 14 and an output circuit 15.

The first current detector 8 has two input terminals to which the voltage between the terminals of the resistor R1 is supplied. The output terminal of the first current detector 8 is connected to the inverting input terminal of the first differential voltage amplification circuit 10. The current detector 8 amplifies the voltage between the terminals of the resistor R1, thereby generating an output signal SG2, and sends the output signal SG2 to the first differential voltage amplification circuit 10.

The first differential voltage amplification circuit 10 amplifies a differential voltage between the voltage of the output signal SG2 and a reference voltage (first threshold value) Vref1 supplied to the non-inverting input terminal of the differential voltage amplification circuit 10, generating an output signal SG3. The differential voltage amplification circuit 10 sends the output signal SG3 to the PWM comparison circuit 13.

The second current detector 9 has two input terminals to which the voltage between the terminals of the resistor R2 is supplied. The output terminal of the second current detector 9 is connected to the inverting input terminal of the second differential voltage amplification circuit 11. The current detector 9 amplifies the voltage between the terminals of the resistor R2, thereby generating an output signal SG4. The current detector 9 sends the output signal SG4 to the second differential voltage amplification circuit 11.

The second differential voltage amplification circuit 11 amplifies a differential voltage between the voltage of the output signal SG4 from the second current detector 9 and a reference voltage (second threshold value) Vref2 supplied to the non-inverting input terminal of the differential voltage amplification circuit 10, generating an output signal SG5. The differential voltage amplification circuit 11 sends the output signal SG5 to the PWM comparison circuit 13.

The charge voltage Vout2 is supplied to the inverting input terminal of the third differential voltage amplification circuit 12. The differential voltage amplification circuit 12 amplifies a differential voltage between the voltage of the charge voltage Vout2 and a reference voltage (third threshold value) Vref3 supplied to the non-inverting input terminal of the differential voltage amplification circuit 12, generating an output signal SG6. The differential voltage amplification circuit 12 sends the output signal SG6 to the PWM comparison circuit 13.

The output signals SG3, SG5 and SG6 of the first to third differential voltage amplification circuits 10, 11 and 12 are supplied to the non-inverting input terminal of the PWM comparison circuit 13. The oscillation circuit 14 supplies the inverting input terminal of the PWM comparison circuit 13 with a triangular signal SG7 having a predetermined frequency.

The PWM comparison circuit 13 compares the triangular signal SG7 with one of the output signals SG3, SG5 and SG6 of the first to third differential voltage amplification circuits 10, 11 and 12 that has the lowest voltage. The PWM comparison circuit 13 outputs an L-level output signal SG8 in a period where the voltage of the triangular signal SG7 is higher than the output signal SG3, SG5 or SG6, and outputs an H-level output signal SG8 in a period where the voltage of the triangular signal SG7 is lower than the output signal SG3, SG5 or SG6.

The output signal SG8 of the PWM comparison circuit 13 is supplied to the output circuit 15. The output circuit 15 supplies the gate of the switching transistor 3 with the output signal SG1, as a duty control signal, which inverts the output signal SG8 of the PWM comparison circuit 13. Therefore, the switching transistor 3 is turned off when the duty control signal SG1 has an H level and is turned on when the signal SG1 has an L level.

In the DC—DC converter 1, as the input voltage Vin is supplied from the AC adapter 4, the output voltage Vout1 and a circuit current I1 are supplied to the internal circuits from the first output terminal EX1. The switching transistor 3 repeats the alternate ON action and OFF action in accordance with the duty control signal SG1 output from the control unit 20. As a result, a charge current IB is supplied to the battery BT from the second output terminal EX2.

In such an operation mode, as the input current Iin (I1+IB) from the AC adapter 4 increases, the voltage between the terminals of the resistor R1 increases so that the voltage of the output signal SG2 of the first current detector 8 rises. As a result, the voltage of the output signal SG3 of the first differential voltage amplification circuit 10 drops. When the voltage of the output signal SG3 becomes lower than the voltages of the output signals SG5 and SG6, the L-level duration of the output signal SG8 of the PWM comparison circuit 13 becomes longer. Consequently, the L-level duration of the duty control signal SG1 becomes shorter, thus making the ON time of the switching transistor 3 shorter. This reduces the charge current IB of the battery BT.

As the input current Iin decreases, on the other hand, the voltage between the terminals of the resistor R1 decreases so that the voltage of the output signal SG2 of the first current detector 8 falls. As a result, the voltage of the output signal SG3 of the first differential voltage amplification circuit 10 rises. When the voltage of the output signal SG3 becomes lower than the voltages of the output signals SG5 and SG6, the L-level duration of the output signal SG8 of the PWM comparison circuit 13 becomes shorter. Consequently, the L-level duration of the duty control signal SG1 becomes longer, thus making the ON time of the switching transistor 3 longer. This increases the charge current IB of the battery BT.

When the voltage of the output signal SG3 of the first differential voltage amplification circuit 10 is higher than the voltages of the output signals SG5 and SG6 of the other differential voltage amplification circuits 11 and 12, the ON time of the switching transistor 3 is controlled in accordance with either the output signal SG5 or output signal SG6.

The above operation controls the output signal SG2 of the first current detector 8 in such a manner that the output signal SG2 converges to the reference voltage Verf1. That is, the input current Iin is so controlled as to fall within the range of the current supplying capacity of the AC adapter 4.

As the charge current IB of the battery BT increases, thus increasing the voltage between the terminals of the resistor R2, the voltage of the output signal SG4 of the second current detector 9 rises. This reduces the voltage of the output signal SG5 of the second differential voltage amplification circuit 11. When the voltage of the output signal SG5 becomes lower than the voltages of the output signals SG3 and SG6, the L-level duration of the output signal SG8 of the PWM comparison circuit 13 becomes longer. Consequently, the L-level duration of the duty control signal SG1 becomes shorter. This makes the ON time of the switching transistor 3 shorter, thus reducing the charge current IB.

As the charge current IB decreases, the voltage between the terminals of the resistor R2 falls, thus reducing the voltage of the output signal SG4 of the second current detector 9. As a result, the voltage of the output signal SG5 of the second differential voltage amplification circuit 11 rises. When the voltage of the output signal SG5 becomes lower than the voltages of the output signals SG3 and SG6, the L-level duration of the output signal SG8 of the PWM comparison circuit 13 gets shorter. This lengthens the L-level duration of the duty control signal SG1. Consequently, the ON time of the switching transistor 3 becomes longer, thus increasing the charge current IB.

When the voltage of the output signal SG5 of the second differential voltage amplification circuit 11 is higher than the voltages of the output signals SG3 and SG6 of the other differential voltage amplification circuits 10 and 12, the ON time of the switching transistor 3 is controlled in accordance with either the output signal SG3 or output signal SG6.

The above operation controls the output signal SG4 of the second current detector 9 in such a manner that the output signal SG4 converges to the reference voltage Vref2. As a result, the charge current IB of the battery BT is controlled to such a given value as not to supply an overcurrent to the battery BT.

When the charge voltage Vout2 of the battery BT rises, the voltage of the output signal SG6 of the third differential voltage amplification circuit 12 falls. When the voltage of the output signal SG6 goes lower than the voltages of the output signals SG3 and SG5, the L-level duration of the output signal SG8 of the PWM comparison circuit 13 becomes longer. Consequently, the L-level duration of the duty control signal SG1 becomes shorter. This makes the ON time of the switching transistor 3 shorter, thereby reducing the charge current IB.

When the charge voltage Vout2 of the battery BT falls, on the other hand, the voltage of the output signal SG6 of the third differential voltage amplification circuit 12 rises. When the voltage of the output signal SG6 goes lower than the voltages of the output signals SG3 and SG5, the L-level duration of the output signal SG8 of the PWM comparison circuit 13 becomes shorter. This lengthens the L-level duration of the duty control signal SG1. As a result, the ON time of the switching transistor 3 becomes longer, thereby increasing the charge current IB.

When the voltage of the output signal SG6 of the third differential voltage amplification circuit 12 is higher than the voltages of the output signals SG3 and SG5 of the other differential voltage amplification circuits 10 and 11, the ON time of the switching transistor 3 is controlled in accordance with either the output signal SG3 or output signal SG5. This operation controls the charge voltage Vout2 of the battery BT in such a way that the charge voltage Vout2 converges to the reference voltage Vref3. That is, the charge voltage Vout2 is controlled to such a given value as not to excessively charge the battery BT.

In short, the first current detector 8 and the first differential voltage amplification circuit 10 in the DC—DC converter 1 control the input current Iin to lie within the range of the current supplying capacity of the AC adapter 4. Further, the second current detector 9 and the second differential voltage amplification circuit 11 control the charge current IB to a given value. The third differential voltage amplification circuit 12 controls the charge voltage Vout2 to a given value.

FIG. 2 is a schematic circuit diagram of a DC—DC converter 1A according to second prior art. The DC—DC converter 1A is the DC—DC converter 1 of the first prior art from which the resistor R1 and the first current detector 8 are removed. The output terminal of the AC adapter 4 is connected to the ground GND via resistors R3 and R4. A node N1 between the resistors R3 and R4 is connected to the inverting input terminal of the differential voltage amplification circuit 10.

In the DC—DC converter 1A, as the input current Iin increases over the current supplying capacity of the AC adapter 4, the input voltage Vin drops. The potential at the node N1 falls then, causing the voltage of the output signal SG3 of the first differential voltage amplification circuit 10 to drop. When the voltage of the output signal SG3 goes lower than the voltages of the output signals SG5 and SG6, the L-level duration of the output signal SG8 of the PWM comparison circuit 13 becomes longer. As a result, the L-level duration of the duty control signal SG1 becomes shorter, thus shortening the ON time of the switching transistor 3. This reduces the charge current IB of the battery BT. At this time, the input current Iin decreases too.

Through the above-described operation, the input current Iin is controlled to lie within the range of the current supplying capacity of the AC adapter 4. The second differential voltage amplification circuit 11 controls the charge current IB of the battery BT and the third differential voltage amplification circuit 12 controls the charge voltage Vout2 of the battery BT.

In FIG. 3, a characteristic line A shows the output voltage versus output current characteristic of the AC adapter 4 (the input voltage Vin versus input current Iin characteristic of the DC—DC converter 1). A characteristic line B shows the charge voltage Vout2 as a function of charge current IB characteristic of the DC—DC converter 1. The AC adapter 4 can change the output current while keeping the output voltage constant.

The AC adapter 4 has an overcurrent limiter which is activated to drop the input voltage Vin when the input current Iin reaches an upper operational limit P1. When the input current Iin reaches a maximum limit P2, the AC adapter 4 is shut down, thus stopping supplying the voltage Vin and the current Iin.

The DC—DC converter 1 charges the battery BT with the charge current IB while maintaining the constant charge voltage Vout2. An upper limit P3 of the charge current IB is set smaller than the upper limit P1 of the output current of the AC adapter 4.

FIG. 4 is a graph showing the relationship between the circuit current I1 and the charge current IB. Because sum of the circuit current I1 and the charge current IB is the input current Iin, as one of the circuit current I1 and the charge current IB increases, the other decreases, as shown in FIG. 4. The slopes of characteristic lines L1 and L2 that show the relationship varies in accordance with the current supplying capacity of the AC adapter 4.

In the first prior art, the input current Iin is set smaller than the upper operational limit P1 of the AC adapter 4. This is because when the input current Iin exceeds the current supplying capacity of the AC adapter 4, the AC adapter 4 is shut down.

One may change one AC adapter to another with a different current supplying capacity in accordance with the use condition; for example, a small-capacity AC adapter may be used in a portable mode while a large-capacity AC adapter may be used in a home or office. In this case, the upper limit of the input current Iin should be set relatively low so that a small-capacity AC adapter, if used, will not be shut down. With such a low upper limit set, the current supplying capacity of a large-capacity AC adapter, if used, cannot be used effectively.

In the second prior art, when the input current Iin exceeds the current supplying capacity of the AC adapter 4, the input voltage Vin drops. Therefore, the charge current IB is suppressed by detecting the drop of the input voltage Vin by the first differential voltage amplification circuit 10. Even if a plurality of AC adapters with different current supplying capacities are selectively changed from one to another to suit the occasion, the current supplying capacity of each AC adapter can be used fully.

With the use of a large-capacity AC adapter, it is not easy to secure the precision of the output voltage drooping characteristic when the output current that exceeds the current supplying capacity is output. The battery BT may therefore be charged with power greater than the allowable output power of the AC adapter. The AC adapter becomes hot in this case, disadvantageously.

SUMMARY OF THE INVENTION

Accordingly, it is an object of the present invention to provide a DC—DC converter which can permit AC adapters with different current supplying capacities to operate stably and can use the current supplying capacities to the full.

To achieve the above object, the present invention provides a DC—DC converter for generating a circuit current and charging a battery. The DC—DC converter includes a supply circuit for supplying the circuit current to internal circuits in accordance with an input current supplied from an external DC power supply, a charge circuit for receiving the input current and supplying a charge current to the battery, and a control unit, connected to the charge circuit, for controlling the charge current. The control unit includes a differential charge controller for comparing the input current with a first threshold value and controlling the charge current according to a result of that comparison, a charge current controller for comparing the charge current with a second threshold value and controlling the charge current according to a result of that comparison, a charge voltage controller for comparing a charge voltage of the battery with a third threshold value and controlling the charge current according to a result of that comparison, and a dynamic charge controller for comparing an input voltage from the external DC power supply with a fourth threshold value and controlling the charge current according to a result of that comparison.

The present invention further provides a semiconductor integrated circuit device for controlling a DC—DC converter. The DC—DC converter has a supply circuit for supplying a circuit current to internal circuits in accordance with an input current supplied from an external DC power supply and a charge circuit for supplying a battery with a charge current based on the input current. The device includes a control unit, connected to the charge circuit, for controlling the charge current. The control unit includes a differential charge controller for comparing the input current with a first threshold value and controlling the charge current according to a result of that comparison, a charge current controller for comparing the charge current with a second threshold value and controlling the charge current according to a result of that comparison, a charge voltage controller for comparing a charge voltage of the battery with a third threshold value and controlling the charge current according to a result of that comparison, and a dynamic charge controller for comparing an input voltage from the external DC power supply with a fourth threshold value and controlling the charge current according to a result of that comparison.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
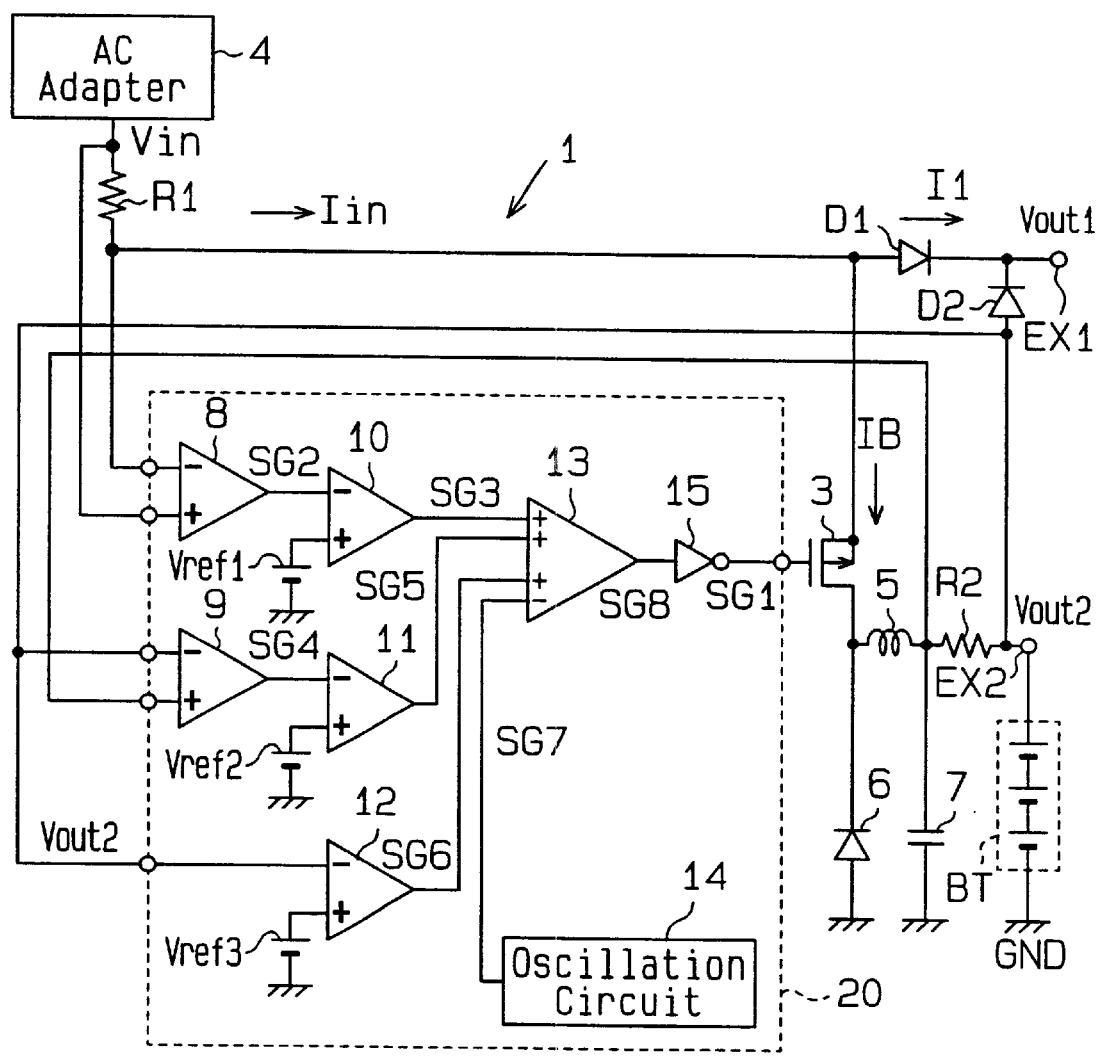
FIG. 1 is a schematic circuit diagram of a DC—DC converter according to the first prior art.
Figure 2:
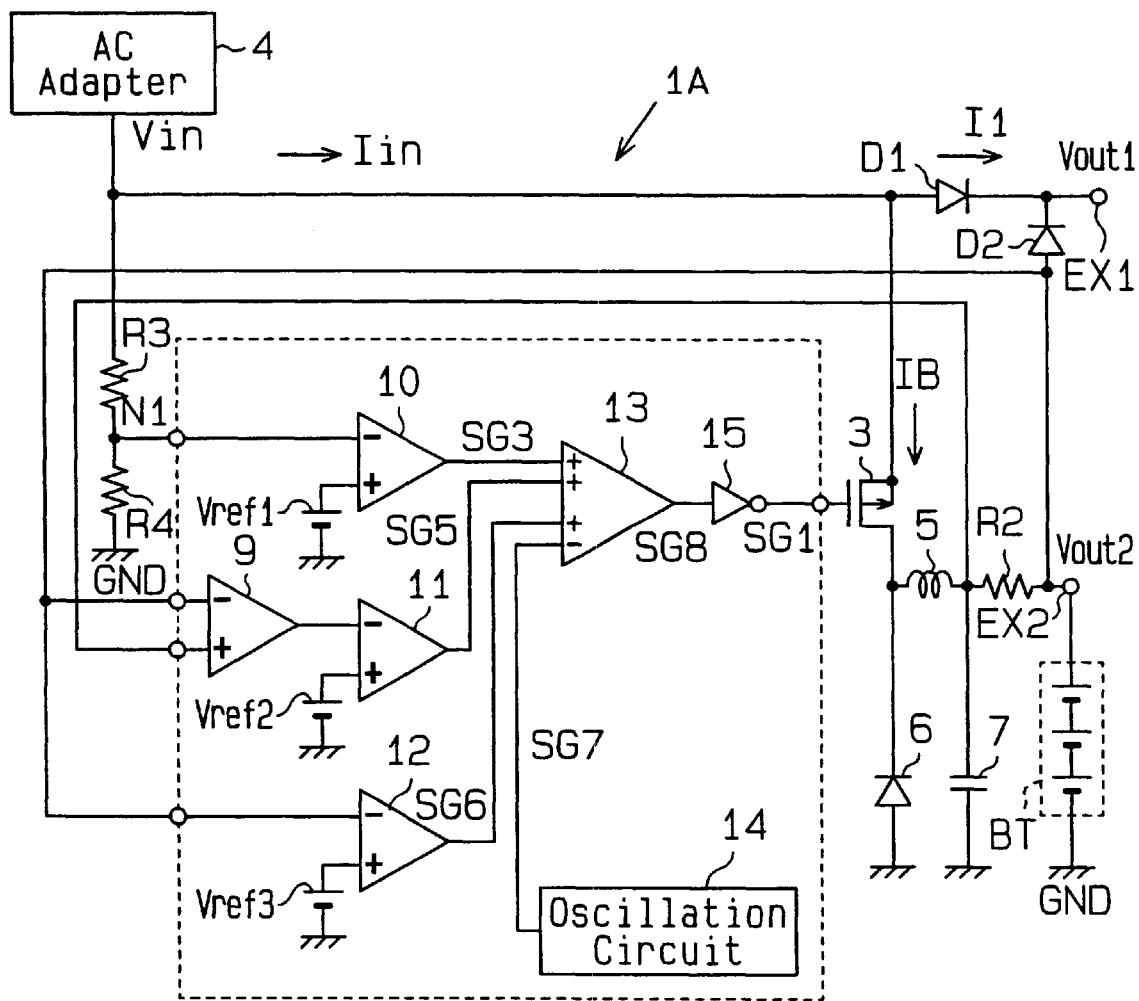
FIG. 2 is a schematic circuit diagram of a DC—DC converter according to the second prior art.
Figure 3:
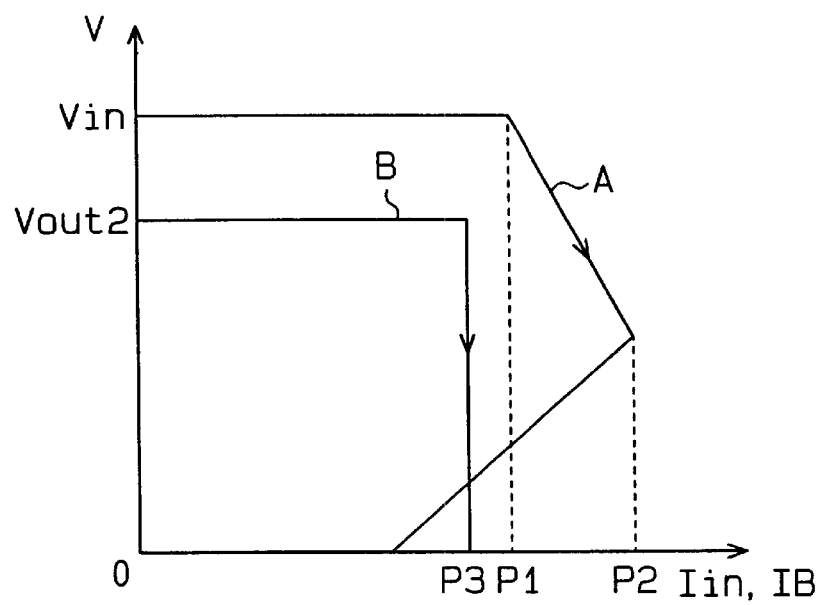
FIG. 3 is a diagram of a voltage versus current characteristic showing the operation of the conventional DC—DC converters.
Figure 4:
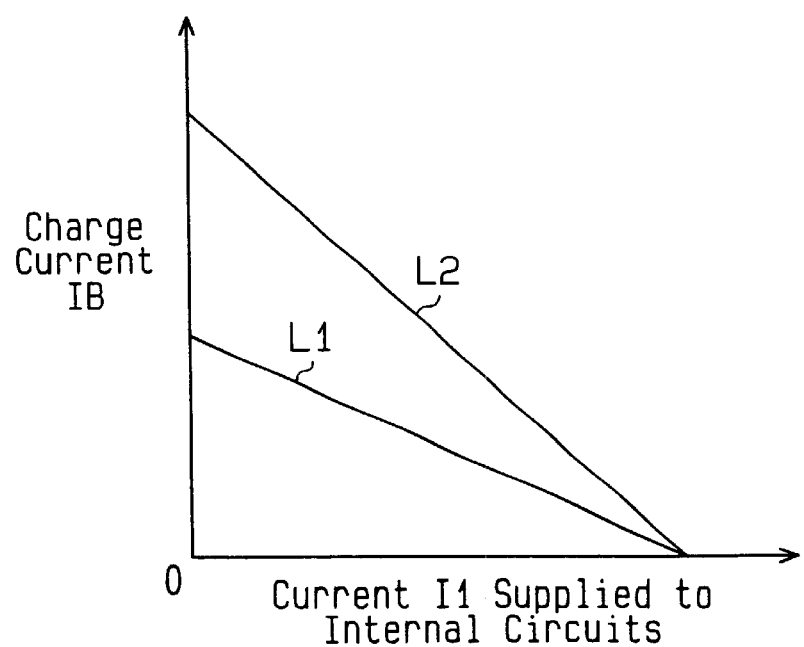
FIG. 4 is a graph showing the relationship between a charge current and a current consumed by internal circuits.

In the drawings, like numerals are used for like elements throughout.

First Embodiment

Figure 5:
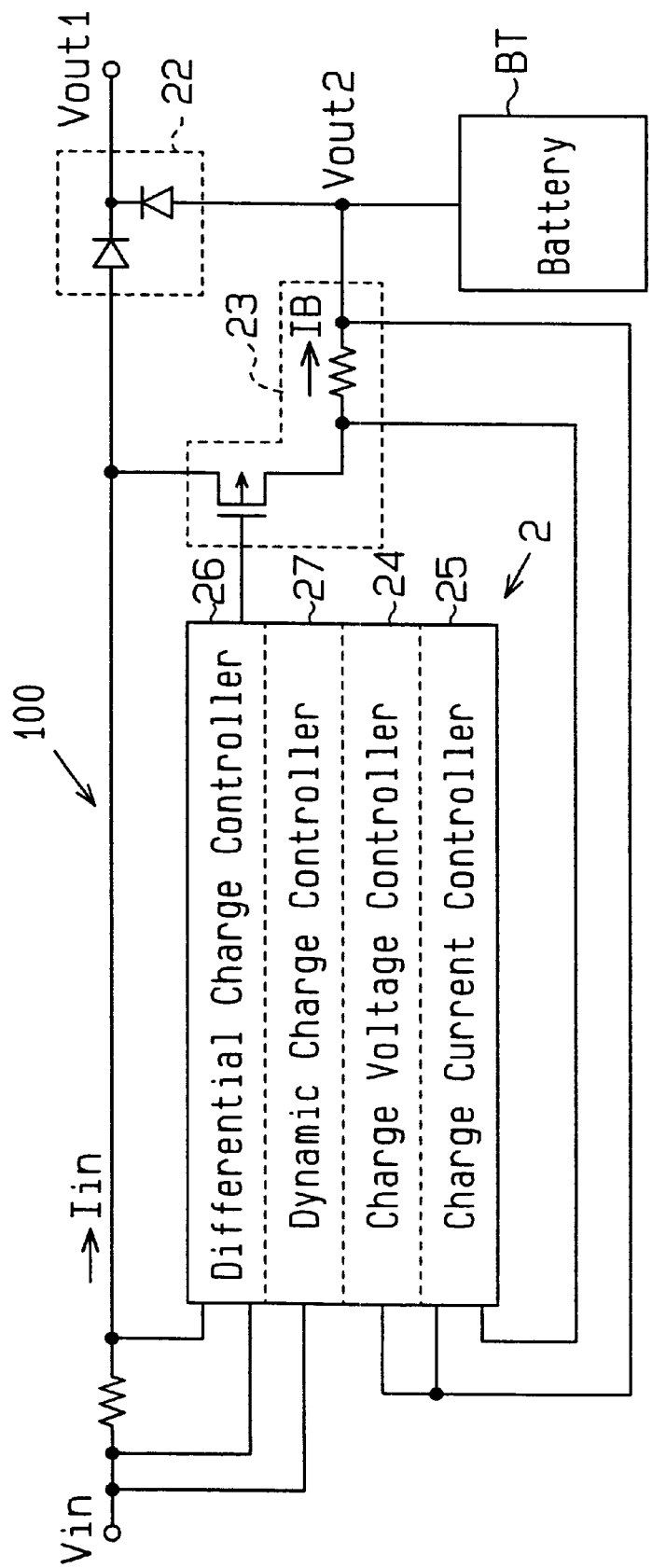
FIG. 5 is a schematic block diagram of a DC—DC converter according to a first embodiment of the present invention.

FIG. 5 is a schematic block diagram of a DC—DC converter 100 according to the first embodiment of the present invention.

The DC—DC converter 100 has a supply circuit 22 which supplies a circuit current I1 to the internal circuits in accordance with an input current Iin supplied from an external DC power supply, a charge circuit 23 which supplies a charge current IB to a battery BT based on the input current Iin, and a control unit 2 which is connected to the charge circuit 23 and controls the charge current IB.

The control unit 2 includes a charge voltage controller 24, a charge current controller 25, a differential charge controller 26 and a dynamic charge controller 27.

The differential charge controller 26 compares the input current Iin with a first threshold value and controls the charge current IB in accordance with the comparison result. The charge current controller 25 compares the charge current IB with a second threshold value and controls the charge current IB in accordance with the comparison result.

The charge voltage controller 24 compares a charge voltage Vout2 from the battery BT with a third threshold value and controls the charge current IB in accordance with the comparison result. The dynamic charge controller 27 compares the input voltage Vin from the external DC power supply with a fourth threshold value and controls the charge current IB in accordance with the comparison result.

Second Embodiment

Figure 6:
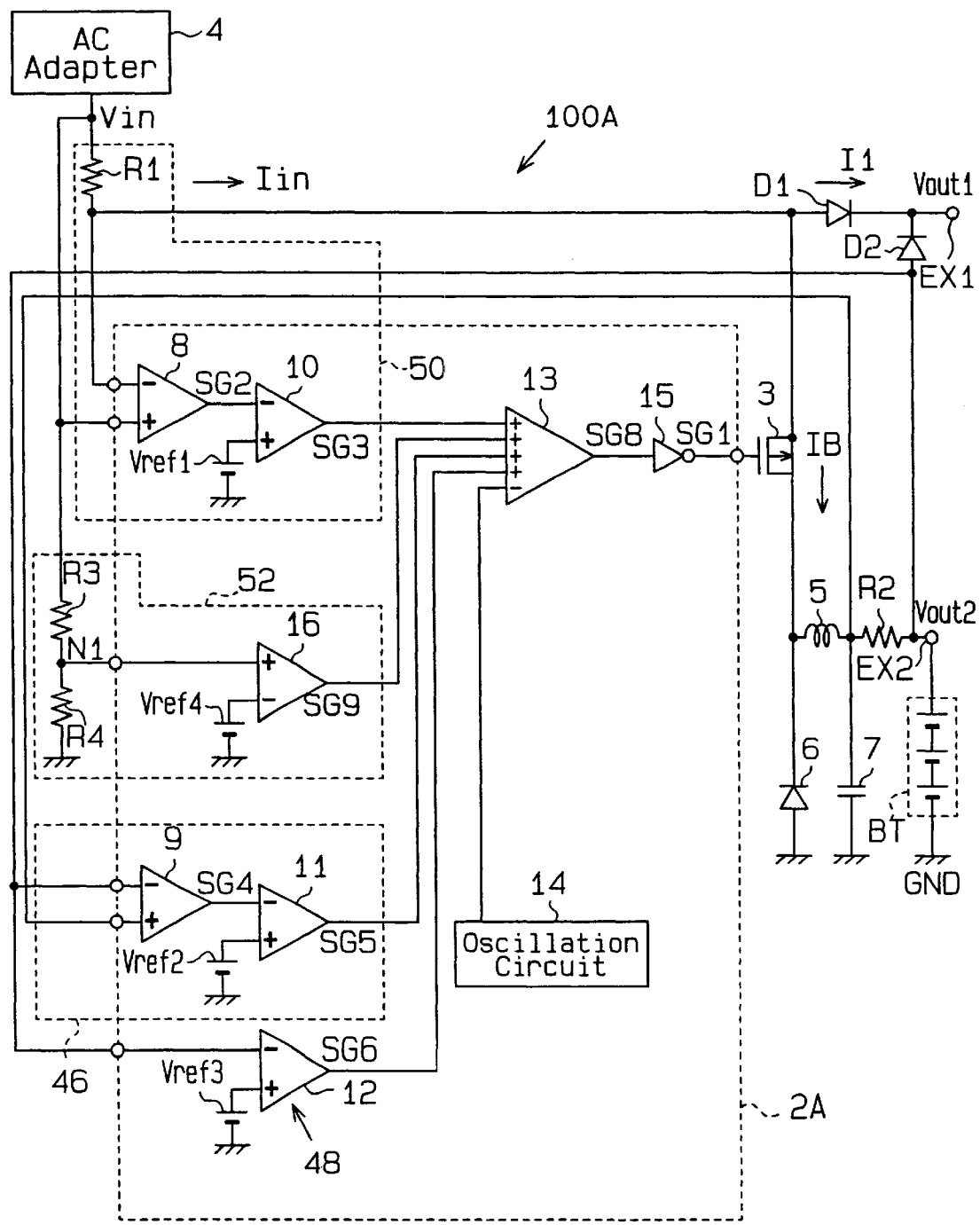
FIG. 6 is a schematic circuit diagram of a DC—DC converter according to a second embodiment of the present invention.

FIG. 6 is a schematic circuit diagram of a DC—DC converter 100A according to the second embodiment of the present invention. A control unit 2A of the DC—DC converter 100A of the second embodiment differs from the control unit 20 of the first prior art.

In the control unit 2A, the voltage between the terminals of a resistor R1 is supplied to the two input terminals of a first current detector 8. The voltage between the terminals of a resistor R2 is supplied to the two input terminals of a second current detector 9. The second current detector 9 and a second differential voltage amplification circuit 11 cooperate as a charge current controller 46 which controls the charge current IB in accordance with the voltage between the terminals of the resistor R2.

A charge voltage Vout2 is supplied to the inverting input terminal of a third differential voltage amplification circuit 12. The differential voltage amplification circuit 12 works as a charge voltage controller 48 which controls the charge voltage Vout2 by controlling the charge current IB.

The output terminal of an AC adapter 4 is connected to the ground GND via resistors R3 and R4. A node N1 between the resistors R3 and R4 is connected to the non-inverting input terminal of a fourth differential voltage amplification circuit 16. The inverting input terminal of the differential voltage amplification circuit 16 is connected to a reference voltage (fourth threshold value) Vref4.

The resistance of the resistor R1 is set to such a value that when the input current Iin of a large-capacity AC adapter 4A reaches near the upper operational limit P1, the first current detector 8 and the first differential voltage amplification circuit 10 can suppress the charge current IB.

The operation of the DC—DC converter 100A will be discussed below.

The charge current IB is controlled by the second current detector 9 and the second differential voltage amplification circuit 11. The charge voltage Vout2 is controlled by the third differential voltage amplification circuit 12.

Figure 9:
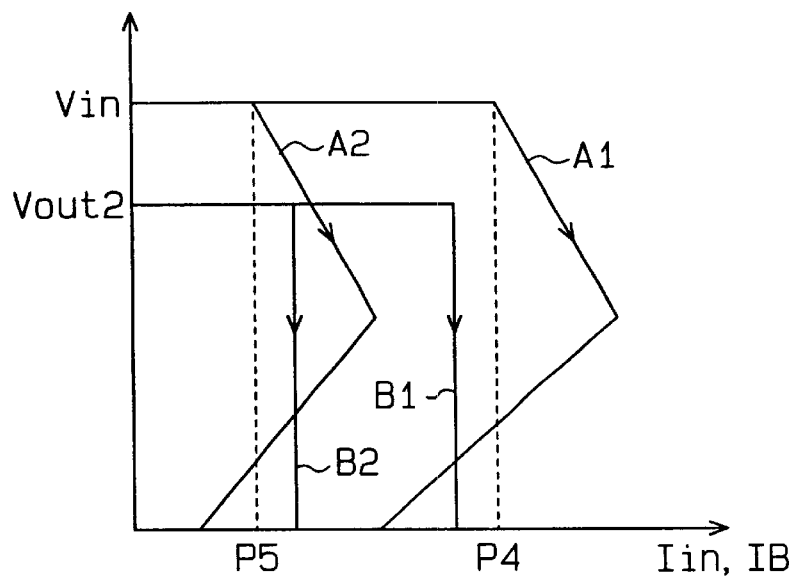
FIG. 9 is a diagram of a voltage versus current characteristic showing the operation of the DC—DC converter in FIG. 6.

In FIG. 9, a characteristic line A1 shows the output voltage versus output current characteristic of the large-capacity AC adapter 4A (the input voltage Vin versus input current Iin characteristic of the DC—DC converter 100A), and a characteristic line A2 shows the output voltage versus output current characteristic of a small-capacity AC adapter 4B. A characteristic line B1 shows the charge voltage Vout2 versus charge current characteristic of the DC—DC converter 100A when the large-capacity AC adapter 4A is used, and a characteristic line B2 shows the charge voltage Vout2 versus charge current characteristic of the DC—DC converter 100A when the small-capacity AC adapter 4B is used.

With the large-capacity AC adapter 4A used, when the input current Iin reaches near an upper operational limit P4 of the AC adapter 4A, the voltage between the terminals of the resistor R1 increases and the voltage of the output signal SG2 of the first current detector 8 increases according to the terminal voltage. As a result, the voltage of the output signal SG3 of the first differential voltage amplification circuit 10 falls, thus shortening the L-level duration of the duty control signal SG1. This makes the ON time of the switching transistor 3 shorter, thereby reducing the charge current IB. Therefore, the input current Iin is controlled within the range that does not go over the upper operational limit P4 of the large-capacity AC adapter 4A.

With the large-capacity AC adapter 4A in use, the resistor R1, the first current detector 8 and the first differential voltage amplification circuit 10 cooperate as a differential charge controller 50, which detects the input current Iin in the vicinity of the upper operational limit P4 and reduces the charge current IB.

When the small-capacity AC adapter 4B is used, the input current Iin that flows across the resistor R1 is small, so that the differential charge controller 50 does not suppress the charge current IB according to the input current Iin. When the small-capacity AC adapter 4B supplies the input current Iin that exceeds an upper operational limit P5 of the AC adapter 4B, the output voltage of the AC adapter 4B falls. Consequently, the voltage of an output signal SG9 of the fourth differential voltage amplification circuit 16 drops, thus making the L-level duration of the duty control signal SG1 shorter. This shortens the ON time of the switching transistor 3, so that the charge current IB decreases.

When the small-capacity AC adapter 4B supplies an input current Iin that exceeds its current supplying capacity, the precision of the output voltage dropping characteristic is easily secured. If the input current Iin exceeds the upper operational limit P5, the fourth differential voltage amplification circuit 16 reduces the charge current IB so that the input current Iin can be reduced.

The resistors R3 and R4 and the fourth differential voltage amplification circuit 16 cooperate as a dynamic charge controller 52 which dynamically detects the input current Iin that exceeds the current supplying capacity of the AC adapter 4 and controls the charge current IB accordingly.

The DC—DC converter 100A of the second embodiment has the following advantages.

(1) The charge current IB is kept constant by the operations of the second current detector 9 and the second differential voltage amplification circuit 11 according to the voltage between the terminals of the resistor R2.

(2) The charge voltage Vout2 is kept constant by the operation of the third differential voltage amplification circuit 12 according to the charge voltage Vout2.

(3) When the large-capacity AC adapter 4A is used, the differential charge controller 50 surely keeps the input current Iin at or below the upper operational limit P4. It is therefore possible to prevent the output of the power that exceeds the allowable output power of the AC adapter 4A and prevent the AC adapter 4A from becoming hot while sufficiently using the current supplying capacity of the AC adapter 4A.

(4) When the small-capacity AC adapter 4B is used, the dynamic charge controller 52 allows the input current Iin to be supplied while fully using the current supplying capacity of the AC adapter 4B.

Third Embodiment

Figure 7:
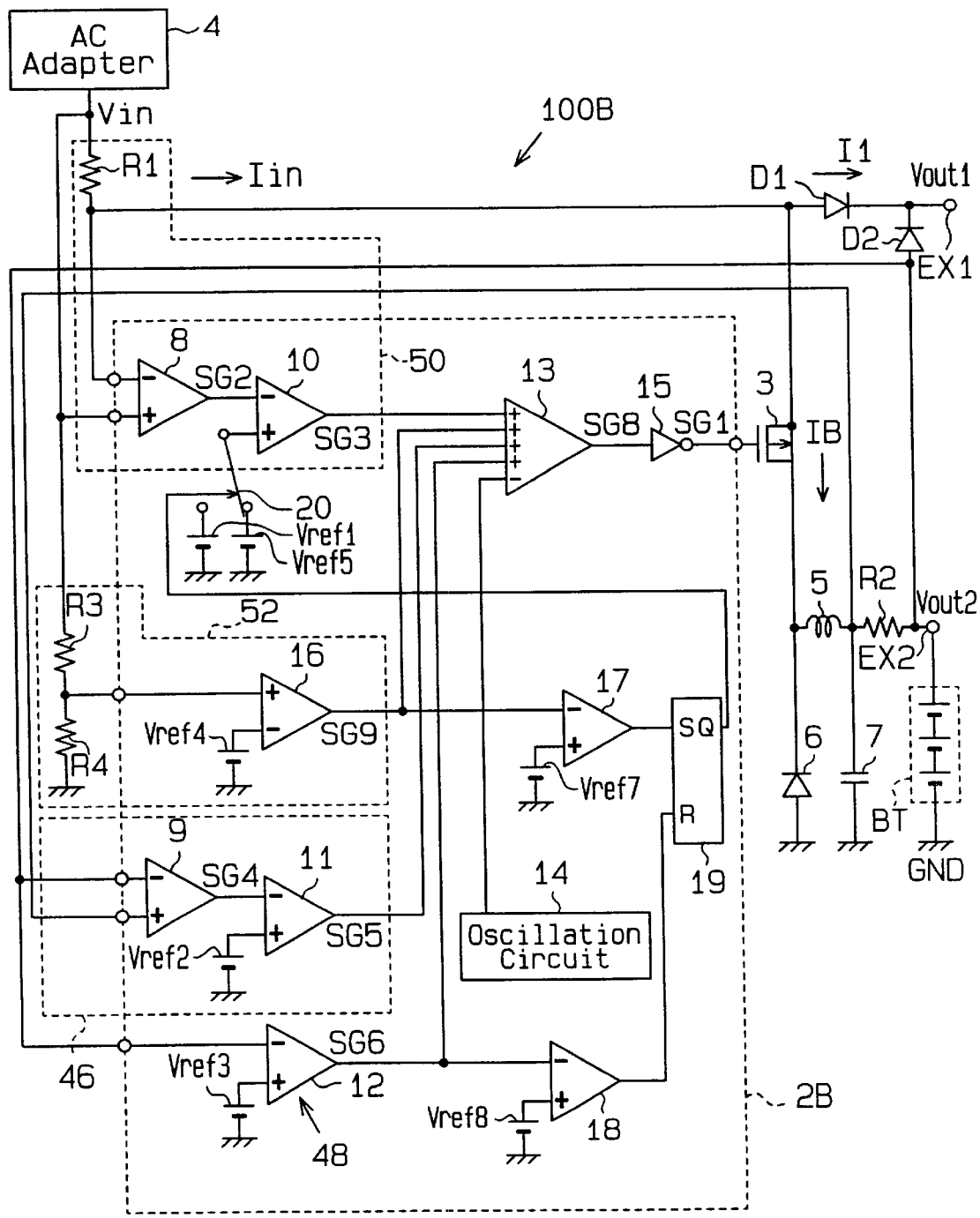
FIG. 7 is a schematic circuit diagram of a DC—DC converter according to a third embodiment of the present invention.

FIG. 7 is a schematic circuit diagram of a DC—DC converter 100B according to the third embodiment of the present invention. A control unit 2B of the third embodiment includes first and second comparators 17 and 18 and a latch circuit 19 in addition to the components of the control unit 2A of the second embodiment.

The output signal SG9 of the fourth differential voltage amplification circuit 16 is supplied to the PWM comparison circuit 13 and the inverting input terminal of the first comparator 17. A reference voltage Vref7 is supplied to the non-inverting input terminal of the first comparator 17. When the voltage of the output signal SG9 of the fourth differential voltage amplification circuit 16 becomes lower than the reference voltage Vref7, the first comparator 17 sends an H-level output signal to a set terminal S of the latch circuit 19.

The output signal SG6 of the third differential voltage amplification circuit 12 is supplied to the PWM comparison circuit 13 and the inverting input terminal of the second comparator 18. A reference voltage Vref8 is supplied to the non-inverting input terminal of the second comparator 18. When the voltage of the output signal SG6 of the third differential voltage amplification circuit 12 becomes lower than the reference voltage Vref8, the second comparator 18 sends an H-level output signal to a reset terminal R of the latch circuit 19.

The latch circuit 19 outputs an H-level output signal Q when receiving an H-level signal at the set terminal S and outputs an L-level output signal Q when receiving an H-level signal at the reset terminal R. The output signal Q of the latch circuit 19 is supplied to a switch circuit 20.

When receiving the L-level signal from the latch circuit 19, the switch circuit 20 supplies a reference voltage Verf1 to the non-inverting input terminal of the first differential voltage amplification circuit 10. When receiving the H-level signal from the latch circuit 19, the switch circuit 20 supplies a reference voltage (fifth threshold value) Vref5 to the non-inverting input terminal of the first differential voltage amplification circuit 10.

The reference voltage Verf1 is the same as the reference voltage Verf1 in the second embodiment. The reference voltage Vref5 is lower than the reference voltage Verf1. The reference voltage Vref5 is used when the first current detector 8 and the first differential voltage amplification circuit 10 work as the differential charge controller 50 in accordance with the input current Iin supplied from the small-capacity AC adapter 4B.

Because the output signal Q of the latch circuit 19 in the DC—DC converter 100B of the third embodiment is initially set to an L level, the reference voltage Verf1 is supplied to the first differential voltage amplification circuit 10 via the switch circuit 20 first.

Figure 10:
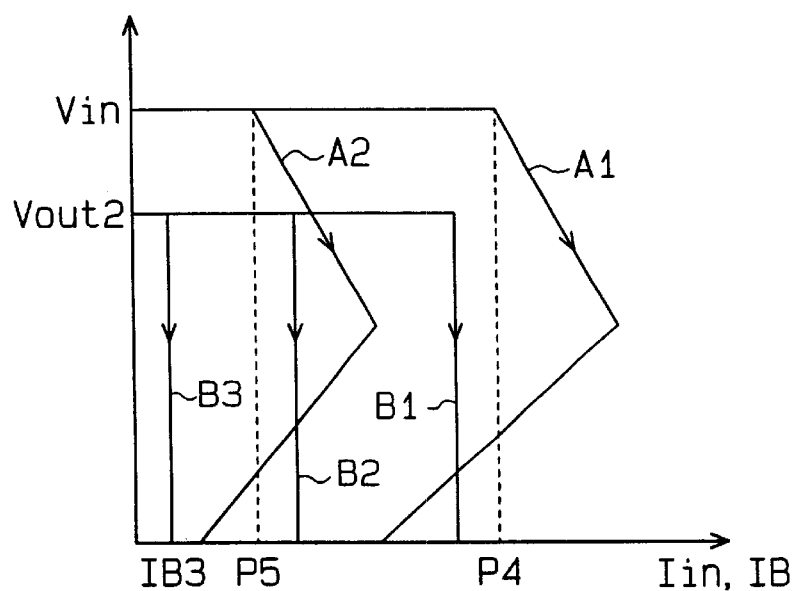
FIG. 10 is a diagram of a voltage versus current characteristic depicting the operation of the DC—DC converter in FIG. 7.

When the large-capacity AC adapter 4A is used, the first current detector 8 and the first differential voltage amplification circuit 10 work as the differential charge controller 50 and the input current Iin is controlled within the range that does not go over the upper operational limit P4 as shown in FIG. 10.

As the charge voltage Vout2 rises, the voltage of the output signal SG6 of the third differential voltage amplification circuit 12 falls. When the voltage of the output signal SG6 falls below the reference voltage Vref8, the output signal of the second comparator 18 goes to an H level, so that the output signal Q of the latch circuit 19 is kept at the L level. When the large-capacity AC adapter 4A is used, therefore, the differential charge controller 50 operates in the same way as that of the second embodiment.

When the small-capacity AC adapter 4B is used, the first differential voltage amplification circuit 10 does not work as the differential charge controller while the reference voltage Verf1 is supplied to the first differential voltage amplification circuit 10. The DC—DC converter 100B operates with the charge voltage as a function of charge current shown by the characteristic line B2 in FIG. 10 in accordance with the input current Iin of the small-capacity AC adapter 4B in the same manner as the second embodiment does.

When the input current Iin goes above the upper operational limit P5 of the AC adapter 4B, the input current Iin decreases, thus lowering the potential at the node N1 as shown in FIG. 10. Then, the voltage of the output signal SG9 of the fourth differential voltage amplification circuit 16 drops. When the voltage of the output signal SG9 goes below the reference voltage Vref7, the first comparator 17 outputs an H-level output signal.

In accordance with the H-level output signal from the first comparator 17, the latch circuit 19 sends an H-level output signal Q to the switch circuit 20. In accordance with the H-level output signal Q, the switch circuit 20 is switched to supply the reference voltage Vref5 to the first differential voltage amplification circuit 10.

As a result, the voltage of the output signal SG3 of the first differential voltage amplification circuit 10 falls, and the PWM comparison circuit 13 operates according to the output signal SG3. The ON time of the switching transistor 3 is shortened in accordance with output signal SG3 and the DC—DC converter 100B operates with the charge voltage versus charge current characteristic shown by a characteristic line B3 in FIG. 10.

Consequently, the charge current IB decreases so that the upper limit of the charge current IB decreases to a current value IB3 under the differential charge control. Therefore, the battery BT is kept charged with the small charge current IB. When the charge voltage Vout2 rises to a predetermined voltage, the voltage of the output signal SG6 of the third differential voltage amplification circuit 12 becomes lower than the reference voltage Vref8.

Then, the second comparator 18 outputs an H-level signal, causing the latch circuit 19 to output the L-level output signal Q. At this time, the switch circuit 20 is switched to supply the reference voltage Verf1 to the first differential voltage amplification circuit 10 again.

The DC—DC converter 100B of the third embodiment has the following advantage.

(1) With the small-capacity AC adapter 4B used, after the dynamic charge controller 52 detects a drop in the output voltage (input voltage Vin) of the AC adapter 4B, the reference voltage Verf1 is automatically switched to the reference voltage (fifth threshold value) Vref5 and the charge current IB is controlled accordingly. After the drop of the input voltage Vin is detected, therefore, the battery BT is kept charged with the small charge current IB so that the AC adapter 4B operates stably.

Fourth Embodiment

Figure 8:
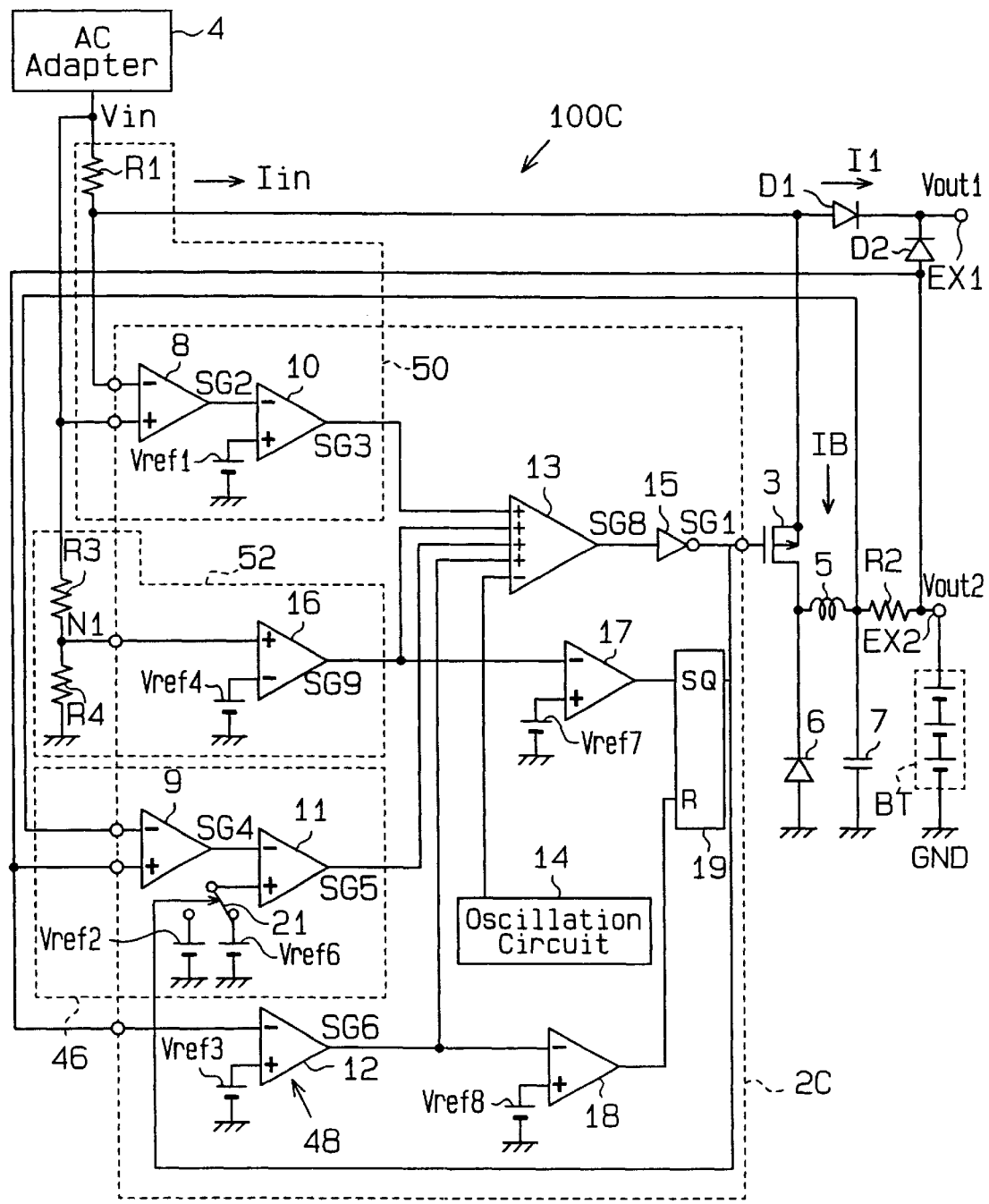
FIG. 8 is a schematic circuit diagram of a DC—DC converter according to a fourth embodiment of the present invention.

FIG. 8 is a schematic circuit diagram of a DC—DC converter 100C according to the fourth embodiment of the present invention. In the fourth embodiment, only the reference voltage Verf1 is supplied to the first differential voltage amplification circuit 10. Either the reference voltage Vref2 or a reference voltage (sixth threshold value) Vref6 is supplied to the second differential voltage amplification circuit 11 via a switch circuit 21.

The switch circuit 21 switches the reference voltages Vref2 and Vref6 of the second differential voltage amplification circuit 11 from one to the other in accordance with the output signal Q of the latch circuit 19. When the output signal Q of the latch circuit 19 has an H level, the reference voltage Vref6 is supplied to the non-inverting input terminal of the second differential voltage amplification circuit 11. When the output signal Q of the latch circuit 19 has an L level, on the other hand, the reference voltage Vref2 is supplied to the non-inverting input terminal of the differential voltage amplification circuit 11.

The reference voltage Vref2 in the fourth embodiment may be the same as the reference voltage Vref2 in the second and third embodiments. The reference voltage Vref6 is lower than the reference voltage Vref2 and is used to decrease the charge current IB.

Because the output signal Q of the latch circuit 19 in the DC—DC converter 100C is initially set to an L level, the reference voltage Vref2 is supplied to the second differential voltage amplification circuit 11 via the switch circuit 21 first.

Figure 11:
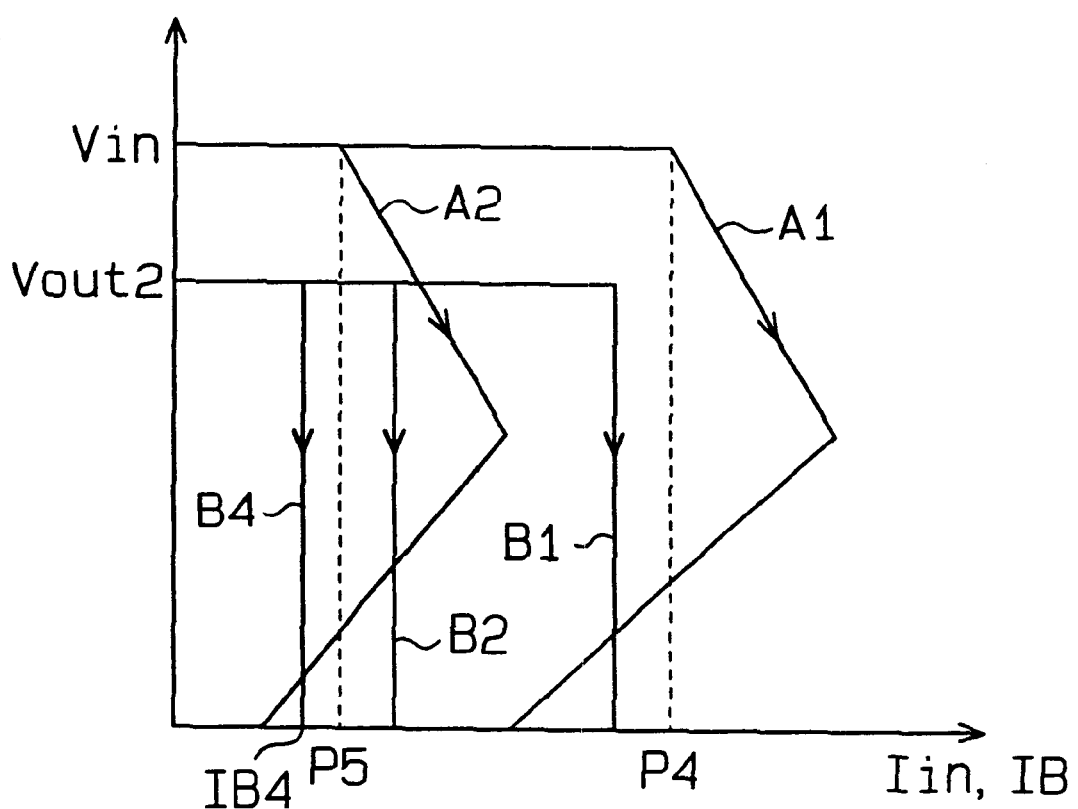
FIG. 11 is a diagram of a voltage versus current characteristic illustrating the operation of the DC—DC converter in FIG. 8.

When the large-capacity AC adapter 4A is used, the first current detector 8 and the first differential voltage amplification circuit 10 work as the differential charge controller 50 similar to that of the second embodiment and controls the input current Iin within the range that does not exceed the upper operational limit P4 as shown in FIG. 11.

As the charge voltage Vout2 rises, the voltage of the output signal SG6 of the third differential voltage amplification circuit 12 falls. When the voltage of the output signal SG6 falls below the reference voltage Vref8, the output signal of the second comparator 18 goes to an H level, so that the output signal Q of the latch circuit 19 stays at the L level. When the large-capacity AC adapter 4A is used, therefore, the DC—DC converter 100C operates in the same way as that of the second embodiment.

When the small-capacity AC adapter 4B is used, on the other hand, the DC—DC converter 100C operates with the charge voltage versus charge current shown by the characteristic line B2 in FIG. 11 while the reference voltage Vref6 is supplied to the second differential voltage amplification circuit 11. When the input current Iin rises above the upper operational limit P5 of the AC adapter 4B, the output voltage (input voltage Vin) falls, thus lowering the potential at the node N1 as shown in FIG. 11. Then, the voltage of the output signal SG9 of the fourth differential voltage amplification circuit 16 drops below the reference voltage Vref7. As a result, the first comparator 17 outputs an H-level output signal.

In accordance with the H-level output signal from the first comparator 17, the latch circuit 19 sends an H-level output signal Q to the switch circuit 21. In accordance with the H-level output signal Q, the switch circuit 21 is switched to supply the reference voltage Vref6 to the second differential voltage amplification circuit 11.

As a result, the voltage of the output signal SG5 of the second differential voltage amplification circuit 11 falls, and the PWM comparison circuit 13 operates according to the output signal SG5. In accordance with output signal SG5, the ON time of the switching transistor 3 is shortened so that the charge current IB decreases. As a result, the upper limit of the charge current IB decreases to a current value IB4 as shown in FIG. 11.

As the reference voltage Vref6 is supplied to the second differential voltage amplification circuit 11, the DC—DC converter 100C operates with the charge voltage versus charge current characteristic shown by a characteristic line B4 in FIG. 11. Therefore, the battery BT is kept charged with the small charge current IB. When the charge voltage Vout2 rises to a predetermined voltage, the voltage of the output signal SG6 of the third differential voltage amplification circuit 12 becomes lower than the reference voltage Vref8. Then, the second comparator 18 outputs an H-level signal, causing the latch circuit 19 to output the L-level output signal Q. As a result, the switch circuit 21 is switched to supply the reference voltage Vref2 to the second differential voltage amplification circuit 11 again.

The DC—DC converter 100C of the fourth embodiment has the following advantages.

(1) With the small-capacity AC adapter 4B used, after the dynamic charge controller 52 detects a drop in the output voltage of the AC adapter 4B (input voltage Vin), the reference voltage Vref2 is automatically switched to the reference voltage (sixth threshold value) Vref6. After the drop of the output voltage of the small-capacity AC adapter 4B is detected, therefore, the battery BT is kept charged with the small charge current IB so that the AC adapter 4B operates stably.

(2) After the drop of the output voltage of the small-capacity AC adapter 4B is detected, the maximum value of the charge current IB is set adequately by the reference voltage Vref6.

Therefore, the present examples and embodiments are to be considered as illustrative and not restrictive, and the invention is not to be limited to the details given herein, but may be modified within the scope and equivalence of the appended claims.

What is claimed is:

1. A DC—DC converter for generating a circuit current and charging a battery, comprising:

a supply circuit for supplying the circuit current to internal circuits in accordance with an input current supplied from an external DC power supply;

a charge circuit for receiving the input current and supplying a charge current to the battery; and a control unit, connected to the charge circuit, for controlling the charge current, the control unit including, a differential charge controller for comparing the input current with a first threshold value and controlling the charge current according to a result of that comparison, a charge current controller for comparing the charge current with a second threshold value and controlling the charge current according to a result of that comparison, a charge voltage controller for comparing a charge voltage of the battery with a third threshold value and controlling the charge current according to a result of that comparison, and a dynamic charge controller for comparing an input voltage from the external DC power supply with a fourth threshold value and controlling the charge current according to a result of that comparison.

2. The DC—DC converter according to claim 1, wherein the control unit is constructed on a single-chip semiconductor substrate.

3. The DC—DC converter according to claim 1, wherein the differential charge controller includes a first differential voltage amplification circuit for comparing the input current with the first threshold value and generating a first detection signal indicating that a value of the input current is equal to or greater than the first threshold value;

the dynamic charge controller includes an input voltage detection circuit for comparing the input voltage with the fourth threshold value and generating a second detection signal indicating that the input voltage has dropped; and the control unit further includes an output circuit, connected to the first differential voltage amplification circuit and the input voltage detection circuit, for generating a first control signal for reducing the charge current in accordance with the first detection signal from the first differential voltage amplification circuit and for generating a second control signal for reducing the charge current in accordance with the second detection signal from the input voltage detection circuit.

4. The DC—DC converter according to claim 3, wherein the control unit further includes an alteration circuit for changing the first threshold value to a fifth threshold value smaller than the first threshold value in accordance with the second detection signal from the input voltage detection circuit.

5. The DC—DC converter according to claim 4, wherein the control unit is constructed on a single-chip semiconductor substrate.

6. The DC—DC converter according to claim 3, wherein the control unit further includes an alteration circuit for changing the second threshold value to a sixth threshold value smaller than the second threshold value in accordance with the second detection signal from the input voltage detection circuit.

7. The DC—DC converter according to claim 6, wherein the control unit is constructed on a single-chip semiconductor substrate.

8. The DC—DC converter according to claim 3, wherein the charge current controller includes a second differential voltage amplification circuit for comparing the charge current with the second threshold value and generating a third detection signal indicating that a value of the charge current is equal to or greater than the second threshold value; and wherein the output circuit is connected to the second differential voltage amplification circuit and generates a third control signal for reducing the charge current in accordance with the third detection signal from the second different voltage amplification circuit.

9. The DC—DC converter according to claim 6, wherein the alteration circuit includes a reset circuit for resetting the changed fifth threshold value in accordance with a comparison result from the charge voltage controller when the charge voltage exceeds the third threshold value.

10. The DC—DC converter according to claim 9, wherein the reset circuit has a latch circuit for generating a switch signal for alternately changing the second and fifth threshold values in accordance with the second detection signal generated by the input voltage detection circuit in the dynamic charge controller and the comparison result from the charge voltage controller.

11. The DC—DC converter according to claim 4, wherein the alteration circuit includes a reset circuit for resetting the changed fifth threshold value in accordance with a comparison result from the charge voltage controller when the charge voltage exceeds the third threshold value.

12. The DC—DC converter according to claim 9, wherein the reset circuit has a latch circuit for generating a switch signal for alternately changing the second and sixth threshold values in accordance with the second detection signal generated by the input voltage detection circuit in the dynamic charge controller and the comparison result from the charge voltage controller.

13. A semiconductor integrated circuit device for controlling a DC—DC converter having a supply circuit for supplying a circuit current to internal circuits in accordance with an input current supplied from an external DC power supply and a charge circuit for supplying a battery with a,charge current based on the input current, the device comprising:

a control unit, connected to the charge circuit, for controlling the charge current, the control unit including, a differential charge controller for comparing the input current with a first threshold value and controlling the charge current according to a result of that comparison, a charge current controller for comparing the charge current with a second threshold value and controlling the charge current according to a result of that comparison, a charge voltage controller for comparing a charge voltage of the battery with a third threshold value and controlling the charge current according to a result of that comparison, and a dynamic charge controller for comparing an input voltage from the external DC power supply with a fourth threshold value and controlling the charge current according to a result of that comparison.

* * * * *

UNITED STATES PATENT AND TRADEMARK OFFICE
CERTIFICATE OF CORRECTION

PATENT NO.    : 6,337,563 B2
DATED         : January 8, 2002
INVENTOR(S)   : Kyuichi Takimoto et al.

It is certified that error appears in the above-identified patent and that said Letters Patent is hereby corrected as shown below:

<u>Title page,</u>
Item [54], please change to title as follows:
From "DC-DC CONVERTER AND SEMICONDUTOR INTEGRATED CIRCUIT DEVICE FOR DC-DC CONVERTER"
To -- DC-DC CONVERTER AND SEMICONDUCTOR INTEGRATED CIRCUIT DEVICE FOR DC-DC CONVERTER --

Signed and Sealed this

Fourth Day of June, 2002

*Attest:*

*Attesting Officer*

JAMES E. ROGAN
*Director of the United States Patent and Trademark Office*